United States Patent [19]

Jarkewicz

[11] Patent Number: 5,296,709
[45] Date of Patent: Mar. 22, 1994

[54] UNIFORMITY CORRECTION OF WHOLE BODY IMAGES TAKEN WITH NON-RECTANGULAR DETECTORS

[75] Inventor: Gary G. Jarkewicz, Willoughby, Ohio

[73] Assignee: Picker International, Inc., Highland Heights, Ohio

[21] Appl. No.: 893,465

[22] Filed: Jun. 4, 1992

[51] Int. Cl.$^5$ ............................................. G01T 1/166
[52] U.S. Cl. ........................... 250/363.07; 250/363.02; 250/363.08
[58] Field of Search ....................... 250/363.07, 363.08, 250/363.02

[56] References Cited

U.S. PATENT DOCUMENTS 4,151,416 4/1979 Richey et al. ................... 250/363.07
4,562,353 12/1985 Del Medico ................... 250/363.07

Primary Examiner—Constantine Hannaher
Attorney, Agent, or Firm—Fay, Sharpe, Beall, Fagan, Minnich & McKee

[57] ABSTRACT

A head (10) of a nuclear medicine camera has a face defined by scintillation crystal (12) which is non-rectangular. In particular, it has symmetrically clipped corners (16). As the head scans from an initial position (32) to a final position (34), radiation originating from regions (72) and (82) are received by the detector head for a shorter duration than radiation from a corresponding point in the central region, due to the clipped corners. Particularly, for a path (74) that is shorter by $2W_1$ than a width $W_0$ of the central portion, $2W_1/W_0$ fewer counts are received in region (82) from a radiation source of the same strength than would have been received in the central region. An edge enhancement circuit (70) boosts the number of radiation events counted in an image memory (54) in pixels corresponding to region (72) by $2W_i/W_0$ and in region (82) by $W_i/W_0$. In the preferred on-line embodiment, the radiation event count adjustment is performed in conjunction with a uniform flood control correction which causes a gate (52) to accept or reject a preselected percentage of the radiation events received at each unit area of the scintillation crystal. The edge enhancement circuit adjusts the uniformity correction factors such that $W_i/W_0$ or $2W_i/W_0$ more radiation events are kept for the edge regions (82, 72).

9 Claims, 3 Drawing Sheets

UNIFORMITY CORRECTION OF WHOLE BODY IMAGES TAKEN WITH NON-RECTANGULAR DETECTORS

BACKGROUND OF THE INVENTION

The present invention relates to the art of nuclear medicine cameras. It finds particular application in conjunction with nuclear medicine cameras having an octagonal, more precisely a rectangular with clipped corners, radiation detector and will be described with particular reference thereto. However, it is to be appreciated that the present invention is applicable to nuclear and other types of scanning detectors with a non-rectangular detector shape.

Heretofore, nuclear medicine cameras have had detectors in a variety of shapes including generally circular, hexagonal, and octagonal. The octagonal detector was commonly a rectangular head with symmetrically clipped corners. When an image was taken with the detector held stationary, the resultant image was also a rectangle with symmetrically clipped corners. Because diagnostically significant information rarely appeared in the corners, a rectangular image with clipped corners was diagnostically satisfactory.

A problem arose, however, when the nuclear medicine camera was used in a scanning mode. In a whole body scan, for example, the detector was positioned over the upper portion of the patient. The detector was initially masked and then progressively unmasked starting at the transverse edge closest to the patient's head. When the detector was completely unmasked, the detector commenced moving longitudinally toward the patient's feet. At the end of the scanning movement, the detector head would stop and its face would be progressively masked starting at the edge toward the patient's head and moving toward the patient's feet.

As the detector moved longitudinally, the portion of the detector corresponding to each pixel of the resultant whole body image was indexed. In this manner, the value at each pixel of the resultant image was the integration or sum of a multiplicity of samplings with the detector at a corresponding multiplicity of positions. Note that for a pixel in a central portion of the image, i.e. corresponding to a region of the patient over which the widest part of the detector passed, the pixel value is the integration of values collected over the full width of the detector. By distinction, pixels near the transverse edges were the integration of values taken over a shorter length of the detector head due to the foreshortening attributable to the clipped corners. Thus, if the tissue corresponding to the pixel in the center were emitting radiation with the same number of counts per second as the pixel corresponding to the tissue at the edge, the number of radiation counts or events in the center would be higher. That is, the number of counts at the edge pixel was reduced by the degree of foreshortening caused by the clipped corners. Thus, the pixel values along the longitudinally extending edges corresponding to the clipped areas would be darker gray or more black. This graying of the longitudinal edges was not only cosmetically unattractive, but diagnostically misleading.

One solution to this graying of the longitudinal edges was to mask the detector. That is, the trapezoid at the longitudinal leading edge of the detector and the trapezoid at the trailing edge were masked, either mechanically or electronically. Once these two portions of the detector head were masked, the detector became effectively a rectangle of the same transverse width, but narrower in the longitudinal direction. This solution also had drawbacks. First, the effective longitudinal length of the detector head was now shorter. Hence, the detector needed to scan proportionately slower to collect the same density of information. The relatively expensive detector had the ability to gather significantly more data in the central region of primary interest but was prevented from doing so by the masking.

The present invention contemplates a new and improved nuclear medicine camera arrangement which overcomes the above-referenced problems and others.

SUMMARY OF THE INVENTION

The present invention contemplates a new and improved nuclear medicine camera in which the number of radiation counts of pixels corresponding to longitudinally edge regions of the image extending along the direction of camera head movement are boosted relative to the number of counts per pixel in the central region.

More specifically to the preferred embodiment, the number of counts of each pixel of the edges scanned under the clipped corners is boosted in proportion to the distance which a path through the pixel in question is foreshortened by the clipping of the corners of the detector. Alternately, the number of counts in the central and edge regions could be reduced, with the edge being reduced in inverse proportion to the distance which a path through the pixel in question is foreshortened by the clipping of the corners of the detector.

In accordance with one aspect of the present invention, the relative number of counts in the central and longitudinal edge regions are adjusted in live-time as the data is being collected.

In another embodiment, the data is post-processed to render the gray scale information consistent across the image.

One advantage of the present invention is that it provides a diagnostic image from a scanning camera in either real time or with post-processing correction in which the data gray scale has uniform meaning across the image.

Another advantage of the present invention is that it improves sensitivity of the detector. The detector has a larger effective detecting area than in the masked correction system of the prior art.

Another advantage of the present invention is that it provides for more rapid scans. Larger areas can be imaged more quickly.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
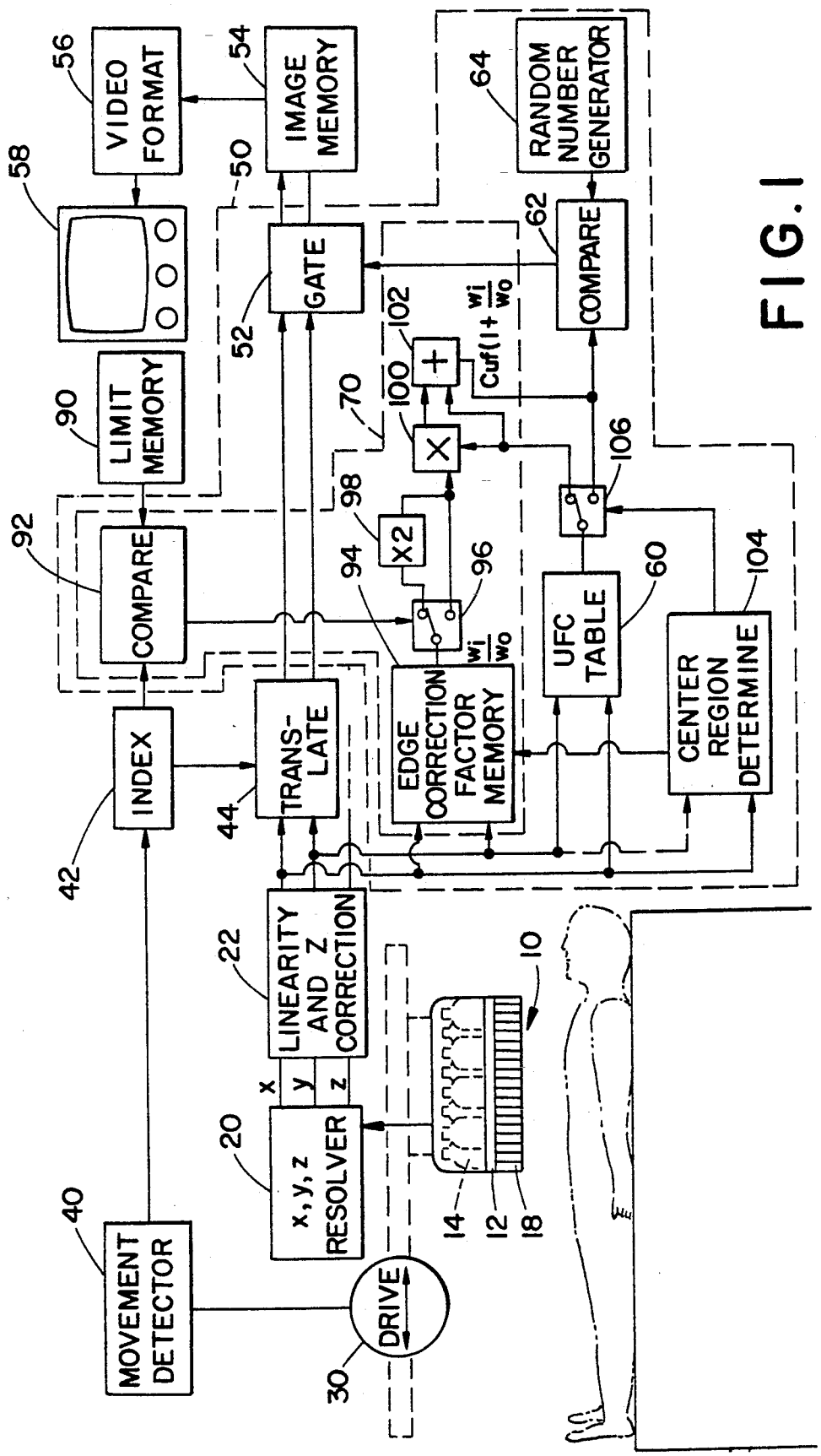
FIG. 1 is a diagrammatic illustration of a nuclear medicine camera in accordance with the present invention.
Figure 2:
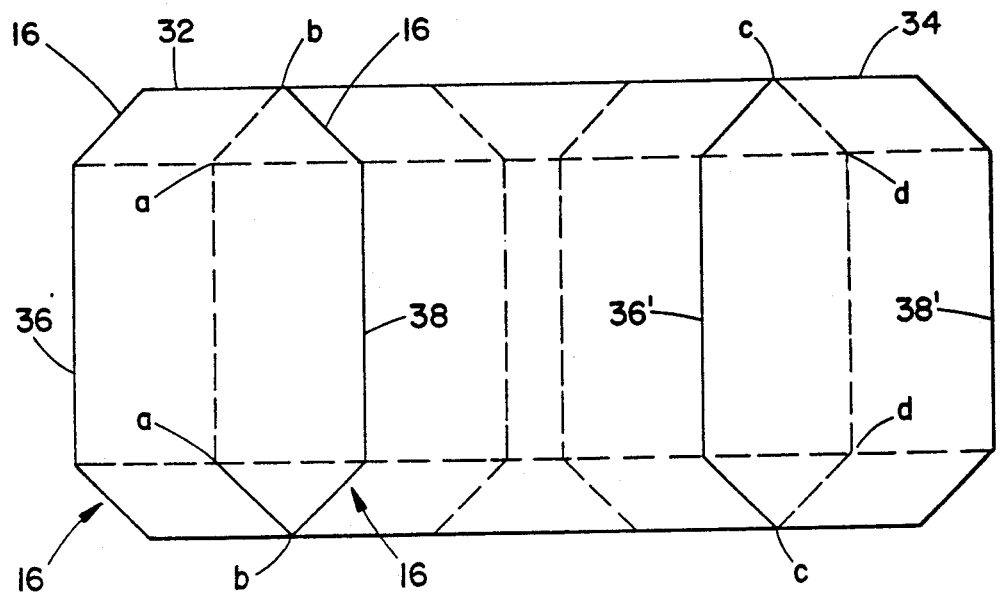
FIG. 2 diagrammatically illustrates scanning of the detector of FIG. 1.
Figure 3:
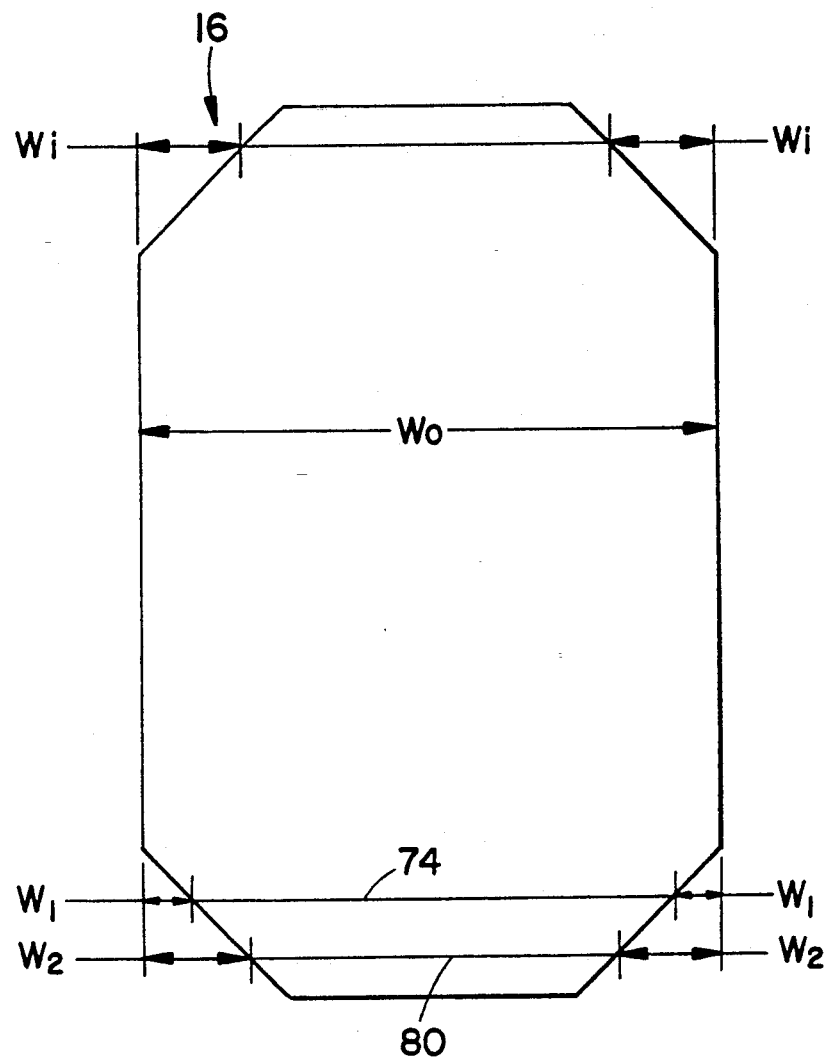

With reference to FIG. 1, a detector 10 includes a scintillation crystal 12 at an array of opto-electrical transducers 14. The scintillation crystal and the face of the detector are generally octagonal, or more precisely, rectangular with clipped corners 16 as illustrated in FIGS. 2 and 3. Radiation, such as from injected radioactive dyes, emanates from the subject, passes through a collimator 18, and strikes the scintillation crystal 12 causing a scintillation or flash of light. The opto-electrical transducer array 14 converts the scintillations into corresponding electrical signals.

A resolver 20 determines the x,y spatial coordinates of each scintillation event and its energy or z value. A linearity and z correction circuit 22 corrects for any inherent distortion in the resolved image. With photomultiplier tubes, for example, there is a tendency for the x,y coordinates to be shifted from areas around the periphery of the photomultiplier tubes toward the center of the photomultiplier tubes. The linearity and z correction circuit makes appropriate linearity corrections to the x,y coordinates, and the z or energy value, as are known in the art.

During a scan, a drive means 30 moves the detector head longitudinally from a starting position 32 to an ending position 34 (FIG. 2). More specifically, a shutter covers the scintillation crystal face 12 at the starting position 32 and starts uncovering a trailing edge 36 of the detector face. When the mask reaches a leading edge 38, the drive means 30 starts translating the detector head longitudinally toward the ending position 34. When the detector reaches the terminal position 34, the mask starts covering the detector, starting at trailing edge 36' and continuing at the same speed which the drive means 30 move the detector until it reaches the leading edge 38'.

As the drive means 30 moves the detector head, a movement detector 40 detects the movement. Each time the detector moves a longitudinal distance corresponding to one pixel in the longitudinal direction, an indexing means 42 indexes a translation means 44. The translation means 44 increments or increases the x coordinate by a distance equivalent to one pixel. The translation means 44 may, for example, be a counter or adder which adds an appropriate dimension to the one of the x and y coordinates which aligns with the longitudinal direction.

Even after the linearity and z correction, the response of the head 10 is typically not completely uniform. That is, if a uniform source of radiation were disposed below the collimator 18 over its whole dimension, the resultant image would not have the same gray scale at every pixel. The gray scale at each pixel of the image is proportional to the number of radiation events detected at a corresponding incremental area by the detector. Rather, there are typically hot or bright spots under the center of each photomultiplier tube, and cool or dark spots between the tubes. The gray scale typically changes in a continuum between the hot and cold spots. To correct this non-uniformity, a uniform flood field is placed under the collimator 18 for a preselected duration. The number of events at each pixel of the image memory are compared and a correction factor for each pixel is determined. A suitable process is shown, for example, in U.S. Pat. No. 4,151,416 to Richey, et al.

Each translated event is conveyed to a uniformity count adjusting means 50 which includes a gate 52 which permits some radiation events to reach an image memory 54 and increment the stored count of the corresponding pixel by one, and rejects other radiation events. The count adjusting means first adjusts count uniformity such as by the method described in the Richey, et al. patent. Alternately, the count adjusting means could cause some radiation events to be counted more than once, e.g. it could be controlled to pass some radiation events to the image memory twice, causing them to be counted twice. A video means 56 converts the number of radiation events corresponding to each pixel stored in the image memory 54 into an appropriate video signal for display on a video monitor 58.

In the embodiment described in the Richey patent, each pixel is assigned a value from 0–255. These values are stored in a uniform flood correction table 60. The numbers are selected such that 255 indicates that all of the events attributable to the corresponding pixel are to be counted, i.e. it is a dark spot. A number 127 indicates that half the numbers are to be counted and half are rejected; a number 191 indicates that three-quarters are to be kept; etc. A comparing means 62 compares the uniform flood correction value from table 60 with a number generated by a random number generator 64 which generates random numbers between 0–255. When the uniform flood correction value is equal to or greater than the generated random number, the event or count is kept; when it is less, it is rejected by the gate 52. Thus, a uniform flood coefficient value which is smaller than half of the possible random numbers to be generated can be expected to be rejected half the time. Alternately, when the correction value is less than the random number the count is kept and when it is greater than the random number the count is added twice.

The count adjusting means 50 further includes an edge enhancement count adjustment means 70 adjusts the number of radiation counts to compensate for the clipped corners 16.

Figure 2A:
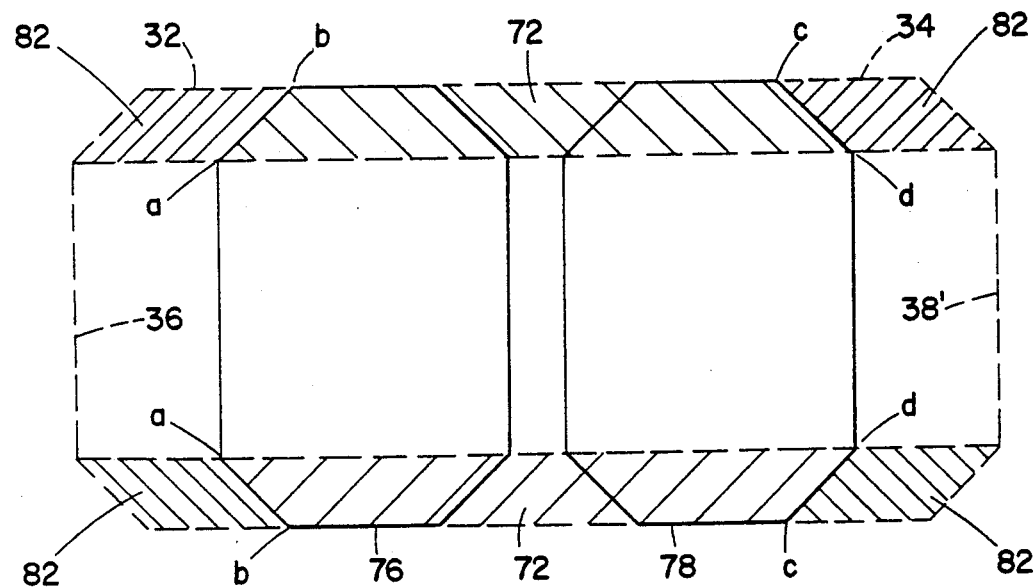
FIG. 2A is the same as FIG. 2, but with regions that received a reduced amount of radiation cross hatched and intermediate locations of the detector head drawn in solid line; and, FIG. 3 illustrates the detector face for exemplifying the mathematical relationships.

With reference to FIGS. 2A and 3, it will be seen that in a regions 72 defined by corners a, b, c, d, a point along path 74 is under a detector head for a distance $2W_1$ shorter than a point under the central region of the detector head. That is, radiation emanating from a point along path 74 receives radiation from the patient for a duration $2W_1$ shorter than a point under a path $W_0$ in the central region. Thus, for the same radiation source to appear the same intensity in both the central region and the edge regions corresponding to the clipped corners, the number of radiation counts must be increased by $2W_1/W_0$ between positions 76 and 78 illustrated in FIG. 2. Analogously, a point under path 80 would be under the detector head $(W_0 - 2W_2)/W_0$ of the time that a point in the central region is under the detector head. Thus, to equalize the radiation counts for radiation sources of like intensities under path 80 and under the central region, the count of the pixels along path so must be increased by $2W_2/W_0$. Generalizing to each of n longitudinal lines or paths of pixels in the edge region 72, pixels in the ith path have their counts increased by $2W_i/W_0$ for $i = 1, 2, \ldots, n$.

It will be observed that points under the edge areas 82 of the detector head between the initial position 32 and position 76 and between position 78 and the final position 34 are only foreshortened by the longitudinal length of one clipped corner. All points receive radiation for the same amount of time as corresponding points in the central region during the mechanical unmasking in the initial position 32 and the masking in the final position 34 of the detector. It is only when the detector head is moving from the initial position that the trailing clipped corners and moving into the final position that the leading clipped corners pass over regions 82. Thus, the regions 82 only need half the correction. That is, points under the ith path need to be increased by only $W_i/W_0$. Thus, points under regions 82 only need half the correction of points under regions 72.

The edge enhancement means 70, in the preferred embodiment, alters the correction factors in or from the uniform flood control table 60 such that fewer events in the edge regions 72 and 82 are discarded. Of course, the alteration may also include discarding a higher percentage of points under the central region. More specifically, a limit memory 90 stores the limits of the selected scan. That is, the operator may select a longer or shorter scan. Based on these limits, a comparing means 92 determines whether a radiation event is in region 72 and 82.

An edge correction factor table 94 stores edge correction factors corresponding to $W_i/W_0$ for each longitudinal path or row of pixels. In the illustrated embodiment, the edge correction factor memory means 94 stores zeros as the correction factors for the central region, i.e. no change in the correction factors from table 60. If the scintillation event is in region 72, the comparing means 92 causes a gate 96 to gate the edge correction factor to a multiplying means 98 which doubles it. If the radiation event is in region 82, then the gate means supplies the correction factor directly to a multiplying means 100. The multiplying means 100 multiplies the uniform flood correction factor $C_{UF}$ by the radio $W_i/W_0$ directly from the gate 96 or the ratio $2W_i/W_0$ from the multiplying means 98. An adding means 102 combines this product to the uniform flood correction factor. In this manner, the uniform flood correction factor is adjusted by the appropriate percentage such that when the comparing means 62 compares it to the random number generator 64, a higher percentage, i.e. $W_i/W_0$ or $2W_i/W_0$ more of the radiation events, will be retained. A center region determining means 104 determines from the y coordinate (for translation in the y direction) whether each event is in the central region or the edge region of the detector. If in central region, the edge correction factor memory 94 is disabled and a gate 106 directs the uniform flood correction coefficient directly to the comparing means 62. The corrected uniformity flood correction factor is preferably returned to the UFC table 60 to save calculating the correction for each pixel. However, the embodiment in which each uniformity flood correction factor is adjusted for each pixel is illustrated for simplicity of illustration.

Alternately, the same correction can be made by post-processing. More specifically, the data is processed in the usual and customary manner without the edge count adjustment means 70, or with the edge count adjustment means 70 disabled. In the final image, the scintillation event counts corresponding to regions 82 are increased by $W_i/W_0$ and the event counts in regions 72 are increased by $2W_i/W_0$. Each longitudinal path or row of pixels within region 72 or 82 is corrected by the same percentage. However, each longitudinal row is corrected by a different percentage.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A nuclear medicine camera comprising:
   a detector head having a radiation receiving face for receiving incident radiation, the radiation receiving face having clipped corners, the detector head including:
   a means for converting incident radiation into flashes of light,
   an opto-electrical transducer for converting each flash of light into electronic signals indicative of a location of the flash of light and an energy of the incident radiation;
   a resolver means for converting the electrical signals from the opto-electrical transducer into coordinates corresponding to the location of the corresponding flash of light;
   a drive means for moving the detector head longitudinally;
   a translation means for translating the coordinates from the resolver means in accordance with the longitudinal movement;
   a uniformity correction means for altering a number of radiation events at each coordinate to correct for intrinsic non-uniformity of the detector head, the uniformity correction means including:
   a uniformity correction factor table which stores a correction factor corresponding to each pixel;
   a random number generator;
   a comparing means for comparing the uniformity correction factors with the random number; and,
   a means for accepting and rejecting each radiation event in accordance with the comparison;
   an image memory means for counting a number of uniformity corrected radiation events corresponding to each of a multiplicity of image pixels;
   an edge enhancement means for altering a number of radiation events counted in the image memory corresponding to longitudinally extending edge regions of the resultant image, which edge regions are passed over by the clipped portions of the detector head energy receiving face as the detector head moves longitudinally, the edge enhancement means including means for altering the uniformity correction factors corresponding to the pixels in the longitudinally extending edge region.

2. The camera as set forth in claim 1 wherein the detector radiation receiving face is generally rectangular having a length $W_0$ centrally in the longitudinal direction with clipped corners such that n longitudinally extending paths along the region with the clipped corners are shorter than the width $W_0$ by $2W_n$ and wherein the edge enhancement means includes:
   an edge correction factor look-up table for storing edge correction factors $W_iW_0$ for each of the n longitudinally extending paths through the clipped region, where i equals 1, 2, ..., n; and a means for increasing the uniformity correction value from the uniformity correction table means by $W_i/W_0$ for events occurring in longitudinally extending row $W_i$.

3. A nuclear medicine camera comprising:

a detector head having a radiation receiving face for receiving incident radiation, the radiation receiving face being generally rectangular having a length $W_0$ centrally in the longitudinal direction with clipped corners such that n longitudinally extending paths along the region with the clipped corners are shorter than the width $W_0$ by $2W_i$ where i equals 1, 2, ..., n, the detector head including:

a means for converting incident radiation into flashes of light, an opto-electrical transducer for converting each flash of light into electronic signals indicative of a location of the flash of light and an energy of the incident radiation;

a resolver means for converting the electrical signals from the opto-electrical transducer into coordinates corresponding to the location of the corresponding flash of light;

a drive means for moving the detector head longitudinally to conduct an imaging scan;

a translation means for translating the coordinates from the resolver means in accordance with the longitudinal movement;

a uniformity correction means for altering a number of radiation events at each coordinate in accordance with corresponding uniformity correction factors stored in a uniformity correction table to improve image uniformity;

an image memory means for counting a number of uniformity corrected radiation events corresponding to each of a multiplicity of image pixels;

an edge enhancement means for altering a number of radiation events counted in the image memory corresponding to longitudinally extending edge regions of the resultant image, which edge regions are passed over by the clipped portions of the detector head energy receiving face as the detector head moves longitudinally, the edge enhancement means including:

an edge correction factor look-up table for storing edge correction factors $W_i W_0$ for each of the n longitudinally extending paths through the clipped region, a means for increasing the uniformity correction value from the uniformity correction table means by $W_i W_0$ for events occurring in longitudinally extending row $W_i$, during starting and ending portions of the imaging scan, a multiplying means for doubling the edge enhancement value and selectively supplying the doubled edge enhancement value to the uniformity correction coefficient increasing means such that the uniformity coefficient is increased by $2W_i/W_0$ during a central portion of the imaging scan.

4. The camera as set forth in claim 3 further including a gating means for selectively gating the correction factors $W_i$ to one of the multiplying means and the uniformity correction factor increasing means in accordance with a longitudinal position of the detector head.

5. A nuclear medicine camera comprising:

a detector head having a radiation receiving face for receiving incident radiation, the radiation receiving face having clipped corners, the detector head including:

a means for converting incident radiation into flashes of light, an opto-electrical transducer for converting each flash of light into electronic signals indicative of a location of the flash of light and an energy of the incident radiation;

a resolver means for converting the electrical signals from the opto-electrical transducer into coordinates corresponding to the location of the corresponding flash of light;

a drive means for moving the detector head longitudinally from a starting position to an ending position;

a translation means for translating the coordinates from the resolver means in accordance with the longitudinal movement;

a uniformity correction means for altering a number of radiation events at each coordinate to improve image uniformity;

an image memory means for counting a number of uniformity corrected radiation events corresponding to each of a multiplicity of image pixels;

an edge enhancement means for altering a number of radiation events counted in the image memory corresponding to longitudinally extending edge regions of the resultant image, which edge regions are passed over by the clipped portions of the detector head energy receiving face as the detector head moves longitudinally, the edge enhancement means including:

an edge correction factor means which is addressed by the coordinates from the resolver means to provide a corresponding edge enhancement correction factor indicative of a first percentage increase of counts at addressed coordinates which correspond to the starting and ending positions of the head to be retained and a second percentage increase of counts at addressed coordinates which correspond to positions of the head between the starting and ending positions, and means for causing the image memory means to count the increased percentage of counts indicated by the edge correction factor means.

6. The camera as set forth in claim 5 wherein the uniformity correction means includes:

a uniformity correction factor table which stores a correction factor corresponding to each pixel;

a random number generator;

a comparing means for comparing the uniformity correction factors with the random number; and, a means for altering radiation events counted in accordance with the comparison; and wherein the edge enhancement means includes means for altering the uniformity correction factors corresponding to the pixels in the longitudinally extending edge region in accordance with the corresponding edge enhancement correction factors.

7. A nuclear medicine camera comprising:

a detector with a non-rectangular radiation receiving face, which radiation receiving face has a maximum dimension $W_0$ in a longitudinal direction for each of a first plurality of longitudinally extending paths and shorter dimensions than $W_0$ in the longitudinal direction for each of a second plurality of longitudinal extending paths;

a means for moving the detector head longitudinally for a distance greater than $W_0$ to conduct an imaging scan;

a means for determining a coordinate location on the non-rectangular radiation receiving face of each incident radiation event;

a means for providing a signal indicative of longitudinal movement of the detector;

a means for translating the coordinates in accordance with the longitudinal detector movement signal;

a count adjusting means for causing (i) a first higher percentage of radiation events along the second plurality of longitudinally extending paths than along the first plurality of longitudinally extending paths of width $W_0$ to be counted during starting and ending portions of the imaging scan and (ii) a second higher percentage of radiation events along the second plurality of longitudinally extending paths than along the first plurality of longitudinally extending paths of width $W_0$ to be counted during a central portion of the imaging scan, the second higher percentage being greater than the first higher percentage;

an image memory means for storing the counts corresponding to each pixel of a resultant image representation.

8. The camera as set forth in claim 7 wherein the count adjusting means includes:

an edge correction factor memory means for storing edge correction factors, the edge correction factor memory means being addressed in accordance with at least a portion of the coordinates of each event to retrieve a corresponding edge correction factor;

a means for adjusting the edge correction factor in accordance with a longitudinal distance along the image; and, a means controlled in accordance with the adjusted edge correction factor for controlling whether each radiation event is counted.

9. A nuclear medicine camera comprising:

a detector ith a non-rectangular radiation receiving face, which radiation receiving face has a maximum dimension $W_0$ in a longitudinal direction for each of a first plurality of longitudinally extending paths and shorter dimensions than $W_0$ in the longitudinal direction for each of a second plurality of longitudinal extending paths;

a means for moving the detector head longitudinally;

a means for determining a coordinate location on the non-rectangular radiation receiving face of each incident radiation event;

a means for providing a signal indicative of longitudinal movement of the detector;

a means for translating the coordinates in accordance with the longitudinal detector movement signal;

a uniformity correction means for altering a number of radiation event s for each coordinate location to correct for intrinsic non-uniformity of the detector head;

an adjusting means for adjusting the number of radiation events altered by the uniformity correction means to cause a higher percentage of radiation events along the second plurality of longitudinally extending paths of dimension less than $W_0$ than along the first plurality of longitudinally extending paths of dimension $W_0$ to be counted;

an image memory means for storing the counts corresponding to each pixel of a resultant image representation.

* * * * *